(12) United States Patent
Takasu et al.

(10) Patent No.: US 8,678,413 B2
(45) Date of Patent: Mar. 25, 2014

(54) ATTACHMENT STRUCTURE FOR RESIN PART OF MOTORCYCLE

(71) Applicant: Kawasaki Jukogyo Kabushiki Kaisha, Hyogo (JP)

(72) Inventors: Akira Takasu, Hyogo (JP); Shuji Shirai, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/671,878

(22) Filed: Nov. 8, 2012

(65) Prior Publication Data
US 2013/0161970 A1 Jun. 27, 2013

(30) Foreign Application Priority Data
Dec. 27, 2011 (JP) ................................. 2011-285132

(51) Int. Cl.
*B62M 29/00* (2006.01)
*B62J 23/00* (2006.01)

(52) U.S. Cl.
USPC .......... 280/219; 280/229; 180/68.1; 296/78.1

(58) Field of Classification Search
USPC .......................... 180/68.1, 219, 229; 296/78.1
See application file for complete search history.

(56) References Cited

U.S. PATENT DOCUMENTS

| 7,686,116 | B2 * | 3/2010 | Oohashi et al. | 180/219 |
| 2006/0175112 | A1 * | 8/2006 | Yoshida et al. | 180/229 |
| 2007/0107967 | A1 * | 5/2007 | Satake | 180/218 |

FOREIGN PATENT DOCUMENTS

JP    2011-58548    3/2011

* cited by examiner

*Primary Examiner* — Joseph M Rocca
*Assistant Examiner* — Marlon Arce
(74) *Attorney, Agent, or Firm* — Wenderoth, Lind & Ponack, L.L.P.

(57) ABSTRACT

An attachment structure for a resin part of a motorcycle includes an attaching portion with a nut provided on a side of a vehicle main body, a resin part having an attached portion with a bolt insertion hole, and a shoulder bolt for attaching the attached portion to the attaching portion with the nut. The shoulder bolt has a threaded shaft portion, a washer, a head portion, and a large diameter portion arranged between the washer and the threaded shaft portion, the large diameter portion being thicker than the threaded shaft portion and thinner than the washer. A thin guide piece protruding toward a radially inner side for regulating radial movement of the shoulder bolt within a predetermined range is integrally formed on an inner circumferential surface of the bolt insertion hole. The guide piece is configured to be deformed by the large diameter portion of the shoulder bolt.

14 Claims, 6 Drawing Sheets

ATTACHMENT STRUCTURE FOR RESIN PART OF MOTORCYCLE

BACKGROUND OF THE INVENTION

1. Field of the Invention

The present invention relates to a structure for attaching a resin cowling, a resin fender, a resin cover, or other resin parts to a vehicle body of a motorcycle with a bolt.

2. Description of the Related Art

Conventionally, in a case where various resin parts are attached to a vehicle body, in order to prevent fastening pressure from becoming excessive due to too much fastening of a bolt, a metal collar is insert-molded into an attached portion (bolt insertion hole) of the resin part so as to be used as a spacer. However, when the collar is insert-molded, manufacture of the resin part takes a lot of effort, and the collar is required separately from the bolt as an attaching part.

Meanwhile, recently, there is employed an attachment structure which omits the insert collar by using a shoulder bolt in which a large diameter portion is formed in a threaded shaft portion of the bolt.

FIG. 8 shows a conventional attachment structure for a resin part 110 utilizing a shoulder bolt 140, and the shoulder bolt 140 integrally has a threaded shaft portion 141 in which a male screw is formed, a head portion 142, a washer 144, and a large diameter portion 143 thicker than the threaded shaft portion 141. A nut 131 is press-fitted and fixed to an attaching portion 130 of a vehicle body frame 101, and a bolt insertion hole 135 having an inner diameter into which the large diameter portion 143 of the shoulder bolt 140 is insertable is formed in an attached portion 120 of the resin part 110.

As a conventional technical document of an attachment structure for a resin part utilizing a shoulder bolt, there is JP 2011-58548 A.

With the conventional structure of FIG. 8, a diameter of the bolt insertion hole 135 formed in the resin part is larger than a diameter of the threaded shaft portion 141 of the shoulder bolt 140. Thus, at the time of assembling, a shoulder surface 143a of the large diameter portion 143 may come upon a seating surface 134 of a peripheral portion of the bolt insertion hole 135 as shown in the figure. In this case, a position of the shoulder bolt 140 and a position of the resin part 110 are required to be corrected, so that an assembling task of the resin part such as a cowling takes a lot of effort.

An object of the present invention is to provide an attachment structure for a resin part of a motorcycle in which at the time of assembling, a shoulder surface of a shoulder bolt does not come upon a seating surface in a periphery of a bolt insertion hole and a large diameter portion of the shoulder bolt can promptly be inserted into the bolt insertion hole.

SUMMARY OF THE INVENTION

In order to achieve the above object, the present invention provides an attachment structure for a resin part of a motorcycle for attaching an attached portion of the resin part having a bolt insertion hole to an attaching portion with a nut provided on a side of a vehicle main body with a shoulder bolt, wherein the shoulder bolt has a large diameter portion thicker than a threaded shaft portion, the bolt insertion hole has an inner diameter into which the large diameter portion of the shoulder bolt is insertable, and a thin guide piece protruding toward a radially inner side for regulating radial movement of the shoulder bolt within a predetermined range is integrally formed on an inner circumferential surface of the bolt insertion hole.

The present invention preferably includes the following configurations in the above configuration.

(a) The thin guide piece is formed in an annular shape over an entire circumference of the inner circumferential surface of the bolt insertion hole.

(b) The thin guide piece is arranged on an opposite side to the attaching portion side with respect to an axially center position of the inner circumferential surface of the bolt insertion hole in an axial direction.

(c) An axial length of the large diameter portion of the shoulder bolt is shorter than a thickness of the attached portion of the resin part by at least a fastening amount.

(d) The resin part is a cowling for covering a vehicle body. In this case, for example, the cowling is formed by combining a plurality of differently-colored division parts, and the attached portion having the thin guide piece is formed in at least one of the parts.

(1) According to the present invention, at the time of assembling by using the shoulder bolt, by a guiding operation of the thin guide piece, the large diameter portion is not abutted with a seating surface on a circumferential edge of the insertion hole but the large diameter portion of the shoulder bolt can promptly be inserted into the bolt insertion hole, so that assembling task efficiency is improved. In comparison to a case where an insert collar is used, cost is low.

(2) Further, the thin guide piece is crushed so as to be pressed onto the inner circumferential surface of the bolt insertion hole by the large diameter portion at the time of assembling. Thus, the thin guide piece can also exert a sealing function between the inner circumferential surface of the bolt insertion hole and the large diameter portion.

(3) According to the configuration (a), the thin guide piece is formed in an annular shape over the entire circumference of the inner circumferential surface of the bolt insertion hole. Thus, the shoulder bolt can reliably be guided to a center position of the bolt insertion hole, and the thin guide piece can easily be formed at the time of resin molding.

(4) According to the configuration (b), the thin guide piece is arranged on the opposite side to the attaching portion side. Thus, immediately after the threaded shaft portion of the shoulder bolt is inserted into the bolt insertion hole, the shoulder bolt can be guided by the thin guide piece.

(5) According to the configuration (c), due to the length of the large diameter portion, the resin part is fastened by the preliminarily set fastening amount or more. Thus, the resin part can be fixed by a desired degree of fastening. Thereby, the resin part can firmly be fastened without backlash.

(6) The resin part is the cowling for covering the vehicle body, and the cowling is formed by combining a plurality of differently-colored division parts, and the attached portion having the thin guide piece is formed in at least one of the parts. In a case where the plurality of division parts are combined stepwise so as to form one part, an error is easily generated at the bolt attachment positions. However, under such a condition, the bolt can easily be guided to the center side of the insertion hole by the thin guide piece, so that assembling is easily performed.

(7) In a case where the plurality of division parts are combined stepwise so as to form one part, an error is easily generated at bolt attachment positions. However, under such a condition, the shoulder bolt can easily be guided to the center position f the bolt insertion hole, so that assembling is easily performed.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE INVENTION

FIGS. 1 to 5 show one embodiment of an attachment structure for a resin part according to the present invention, and the present embodiment will be described based on these figures.

Figure 1:
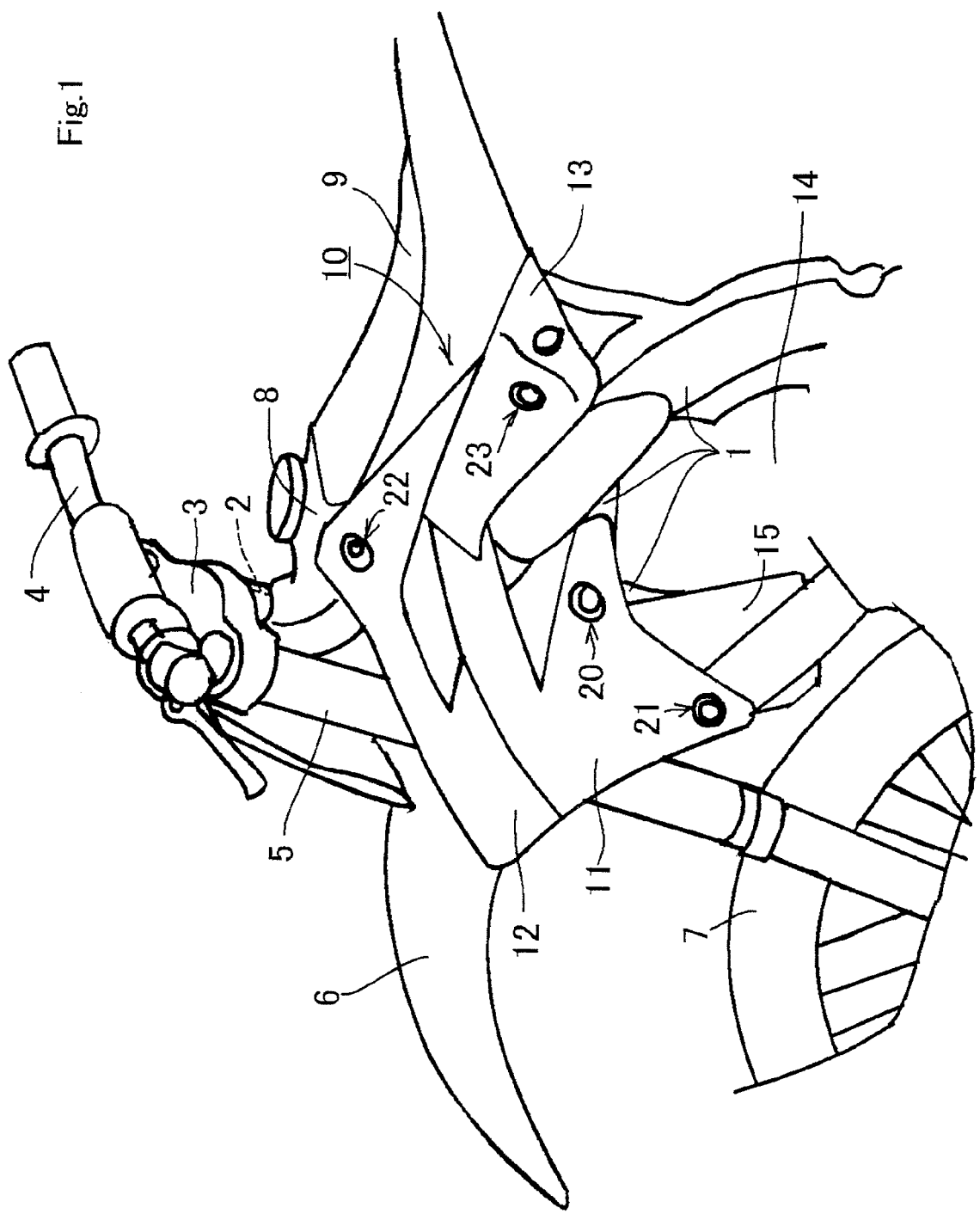
FIG. 1 is a perspective view of a front upper part of a motorcycle provided with an attachment structure for a resin part according to the present invention.

FIG. 1 is a perspective view of a front upper part of a motorcycle. In a front upper end of a main frame 1, a steering bracket 3 is supported via a steering shaft 2 so as to be rotated leftward and rightward, and onto the steering bracket 3, a handle bar 4 is fixed via an attachment bracket. The steering bracket 3 is coupled to upper ends of left and right front forks 5, and a front wheel 7 is supported on lower ends of the left and right front forks 5. An engine 14 is arranged on the lower side of the main frame 1. A fuel tank 8, a seat 9, and the like are arranged on the main frame 1.

A pair of left and right resin cowlings 10 (the right cowling is not shown) are arranged so as to cover a part of the fuel tank 8, the left front fork 5, the engine 14, a radiator 15, and the like from the side. In relation to design, the cowling 10 is formed by integrating three differently-colored resin parts which are first, second, and third parts 11, 12, 13. A plurality of attached portions 20, 21, 22, 23 are formed in the cowling 10.

In the embodiment having above the attached portions 20, 21, 22, 23, the attachment structure having a thin guide piece according to the present invention is adopted in the three attached portions 20, 22, 23. The three attached portions 20, 22, 23 are formed on the same surface (a mating surface of upper and lower dies) at the time of resin molding with the dies.

Figure 4:
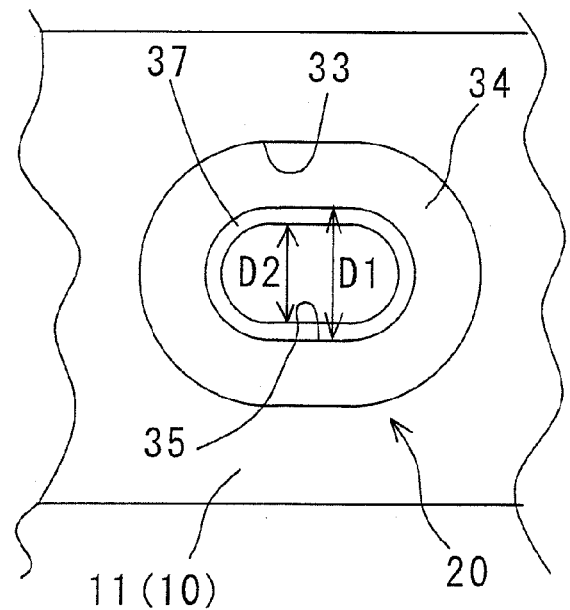
FIG. 4 is an enlarged side view of the attached portion of FIG. 2.
Figure 5:
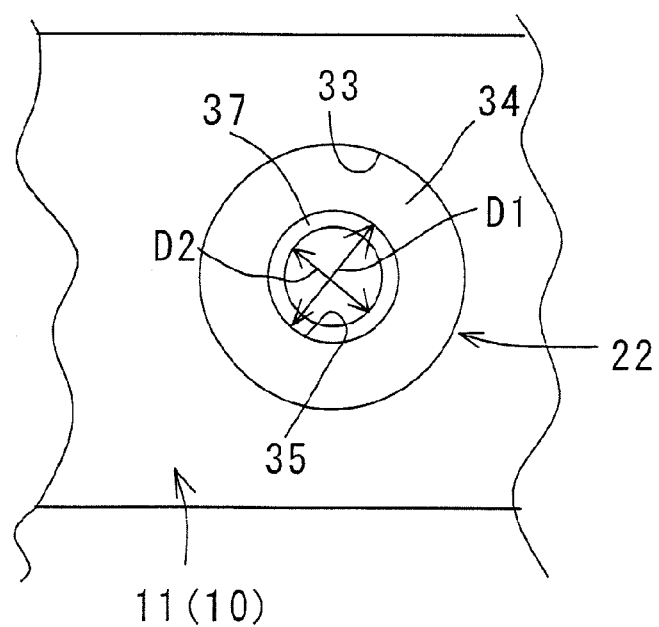
FIG. 5 is an enlarged side view of an attached portion at a different point from the attached portion of FIG. 4.

As shown in FIG. 4 and FIG. 1, a long hole bolt insertion hole 35 are formed in the rear side attached portion 20 of the first part 11 and the front side attached portion 23 of the third part 13. As shown in FIG. 5 and FIG. 1, round bolt insertion holes 35 are formed in the other attached portions 21, 22.

Figure 2:
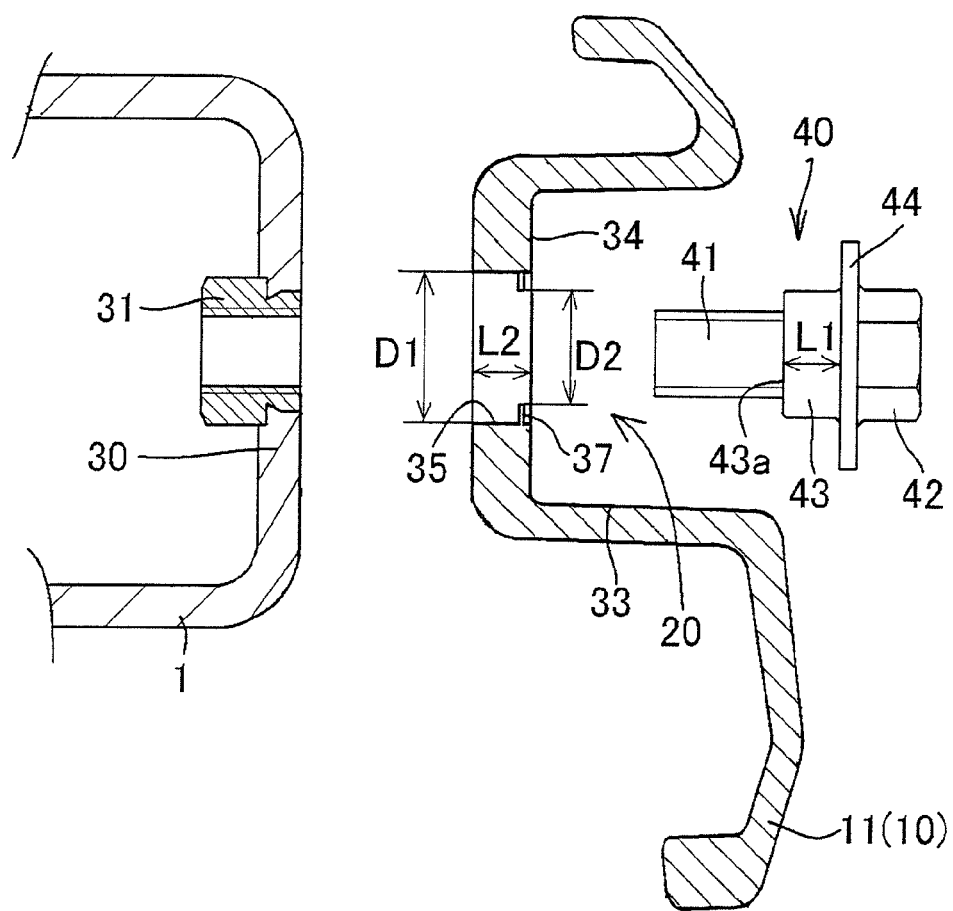
FIG. 2 is an exploded and enlarged sectional view showing an attached portion of a resin cowling and an attaching portion of a vehicle body before assembling.
Figure 3:
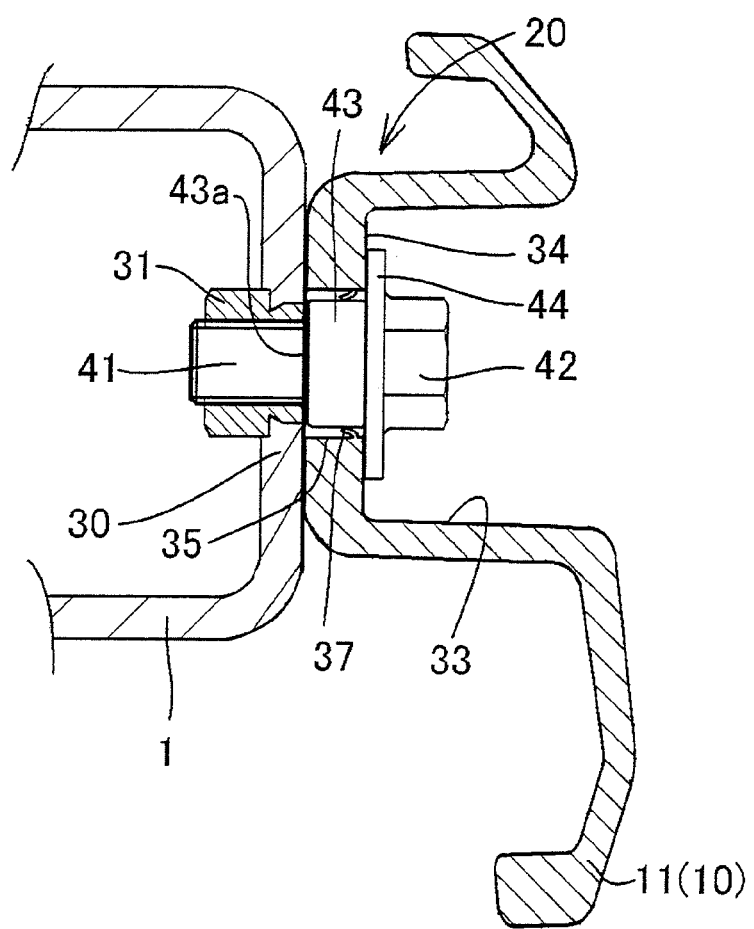
FIG. 3 is an enlarged sectional view showing the attached portion of the resin cowling and the attaching portion of the vehicle body after assembling.

FIG. 2 is an exploded and enlarged sectional view of the attached portion 20 having the long-hole bolt insertion hole 35 before assembling, FIG. 4 is an enlarged side view of the attached portion 20 which is the same as FIG. 3, and FIG. 5 is an enlarged side view of the attached portion 22 at a different point from FIG. 4.

In FIG. 2, a nut 31 is press-fitted and fixed to a nut attachment hole of an attaching portion 30 provided on a side surface of the main frame 1.

A shoulder bolt 40 is integrally provided with a threaded shaft portion 41 in which a male screw is formed, a washer 44, a head portion 42, and a large diameter portion 43 thicker than the threaded shaft portion 41 and thinner than the washer 44.

The attached portion 20 provided in the first part 11 of the cowling 10 includes a spot facing portion (or concave portion) 33 capable of accommodating the washer 44 and the head portion 42 of the shoulder bolt 40, and the long hole bolt insertion hole 35 formed on a seating surface 34 of the spot facing portion 33. On an inner circumferential surface of the bolt insertion hole 35, a thin guide piece 37 protruding toward the radially inner side is resin-molded integrally with the first part 11. The thin guide piece 37 is formed at a position close to the opposite side to the attaching portion 30 side in the bolt axial direction.

The bolt insertion hole 35 of the attached portion 20 is a long hole as described above, and a short diameter (minor axis) D1 of the bolt insertion hole 35 is set to have such a size that the large diameter portion 43 of the shoulder bolt 40 is insertable. However, inward projection width of the thin guide piece 37 is set in such a manner that a short diameter (minor axis) D2 of a space surrounded by the thin guide piece 37 has such a size that the threaded shaft portion 41 of the shoulder bolt 40 is insertable but is smaller than a diameter of the large diameter portion 43.

It should be noted that when the short diameter D2 of the space is larger than a diameter of the threaded shaft portion 41, the threaded shaft portion 41 is insertable as a matter of course. However, even if the short diameter D2 of the space is smaller than the diameter of the threaded shaft portion 41, the present invention includes such short diameter D2 of the space that the threaded shaft portion 41 can be pressed into the space to an extent that the thin guide piece 37 is not crushed (to an extent that the thin guide piece is slightly warped).

A thickness of the thin guide piece 37 is set within a range from 0.3 mm to 0.5 mm, for example. When the thickness is less than 0.3 mm, molten resin does not easily flow into a cavity for the thin guide piece at the time of resin molding of the cowling 10 (the first part 11). Meanwhile, when the thickness is more than 0.5 mm, rigidity of the thin guide piece 37 is increased and the thin guide piece 37 is not easily warped by the large diameter portion 43 at the time of inserting the bolt. Thus, the thickness is preferably within the range from 0.3 mm to 0.5 mm. It should be noted that the projection width of the thin guide piece 37 is smaller than a difference between a radius of the large diameter portion 43 and a radius of the threaded shaft portion 41 of the shoulder bolt 40.

An axial length L1 of the large diameter portion 43 of the shoulder bolt 40 is formed so as to be shorter than an axial length (thickness) L2 of the bolt insertion hole 35 by at least a fastening amount (such as 0.1 mm).

In FIGS. 4 and 5, the thin guide piece 37 of the bolt insertion hole 35 is formed in an annular shape over an entire circumference of the inner circumferential surface of the bolt insertion hole 35.

[Attachment Task of Cowling]

In a case where the cowling 10 of FIG. 1 is attached to the main frame 1, firstly, the attached portion 22 having the round bolt insertion hole 35 (FIG. 5) is attached to the fuel tank 8, and then the attached portions 20, 23, and the like having the long-hole bolt insertion hole 35 (FIG. 4) and the thin guide piece 37 (FIG. 3) are attached to the main frame 1 and the fuel tank 8.

In FIG. 2, in a case where the attached portion 20 in a rear part of the first part 11 of the cowling 10 is attached by the shoulder bolt 40, the shoulder bolt 40 is inserted into the bolt insertion hole 35 of the attached portion 20, and then by screwing the shoulder bolt 40 into the nut 31 of the attaching portion 30 of the main frame 1, the attached portion 20 is attached to the attaching portion 30.

In this attachment task, when the threaded shaft portion 41 of the shoulder bolt 40 is inserted into the bolt insertion hole 35, the threaded shaft portion 41 is guided to a center position of the bolt insertion hole 35 by the thin guide piece 37. Therefore, the large diameter portion 43 is not abutted with the seating surface 34 of the spot facing part 33 but promptly guided into the bolt insertion hole 35.

Immediately after the large diameter portion 43 is inserted into the bolt insertion hole 35, a shoulder surface 43a of the large diameter portion 43 is abutted with the thin guide piece 37. However, by strongly pressing in the shoulder bolt 40, the large diameter portion 43 comes into the bolt insertion hole 35 while pressing and crushing the thin guide piece 37 toward the radially outer side.

Finally, as shown in FIG. 3, the threaded shaft portion 41 is screwed into the nut 31 and the washer 44 is abutted with the seating surface 34 of the spot facing part 33, and then, by further screwing by a predetermined fastening amount (fastening torque), the shoulder surface 43a of the large diameter portion 43 is pressure-bonded to an end surface of the nut 31. Thereby, in a state where a fastening force is maintained at predetermined pressure by the large diameter portion 43 operating as a collar, the attached portion 20 of the first part 11 is attached to the attaching portion 30 of the main frame 1.

In a case where the three differently-colored parts 11, 12, 13 are integrally formed as in the cowling 10 of FIG. 1, an error is easily generated at formation positions of the bolt insertion holes of the attached portions 20, 21, 22, 23. In the present embodiment, in a case where such a combined type cowling 10 is attached, radial positioning of the shoulder bolt 40 can readily be performed.

After assembling with the shoulder bolt 40, the pressed and crushed thin guide piece 37 is nipped between an outer surface of the large diameter portion 43 and the inner circumferential surface of the bolt insertion hole 35 in a compressed state. Thereby, the thin guide piece can also exert a sealing function.

In a case where the attached portions 22, 23 having other thin guide pieces of FIG. 1 are attached with the shoulder bolt, as well as the above description, the large diameter portion is not abutted with the seating surface but can promptly be attached.

Effects of the Embodiment (1) In FIGS. 2 and 3, at the time of assembling the cowling 10 by using the shoulder bolt 40, by a guiding operation of the thin guide piece 37, the large diameter portion 43 is not abutted with the seating surface 34 on a circumferential edge of the bolt insertion hole but the large diameter portion 43 can promptly be inserted into the bolt insertion hole 35, so that assembling task efficiency is improved. In comparison to a case where an insert collar is used, cost is low.

(2) The thin guide piece 37 is crushed so as to be pressed onto the inner circumferential surface of the bolt insertion hole 35 by the large diameter portion 43 at the time of assembling. Thus, the thin guide piece 37 can also exert a sealing function between the inner circumferential surface of the bolt insertion hole 35 and the large diameter portion 43.

(3) The thin guide piece 37 is formed in an annular shape over the entire circumference of the inner circumferential surface of the bolt insertion hole 35. Thus, the shoulder bolt 40 can reliably be guided to the center position of the bolt insertion hole 35, and the thin guide piece 37 can easily be formed at the time of resin molding.

(4) The thin guide piece 37 is arranged on the opposite side to the attaching portion 30 side in the axial direction of the shoulder bolt 40. Thus, immediately after the threaded shaft portion 41 of the shoulder bolt 40 is inserted into the bolt insertion hole 35, the shoulder bolt 40 can be guided by the thin guide piece 37.

(5) The large diameter portion 43 serves as an insert collar and fastens the attached portion 20 of the cowling 10 by the preliminarily set fastening amount. Thus, the resin part can be fixed by a desired degree of fastening. Thereby, the resin part can firmly be fastened without backlash.

(6) In a case where the plurality of division parts 11, 12, 13 are combined stepwise so as to form one part, an error is easily generated at the bolt attachment positions. However, under such a condition, the bolt can easily be guided to the center position of the insertion hole, so that assembling is easily performed.

Figure 6:
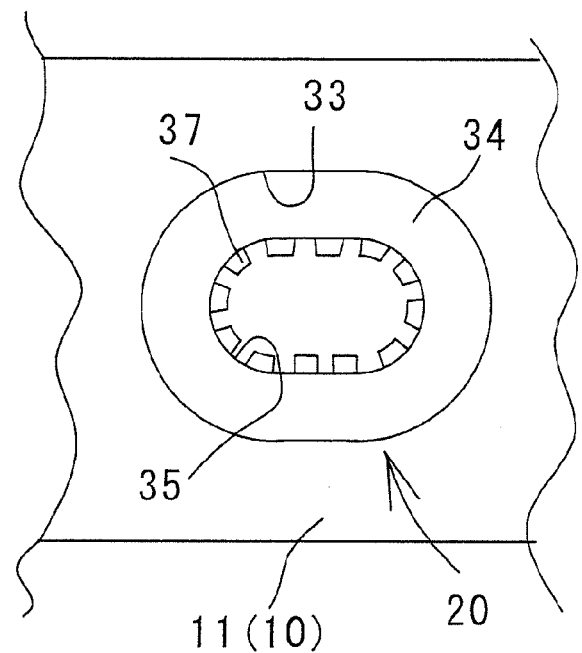
FIG. 6 is an enlarged view showing a modified example of thin guide pieces.
Figure 7:
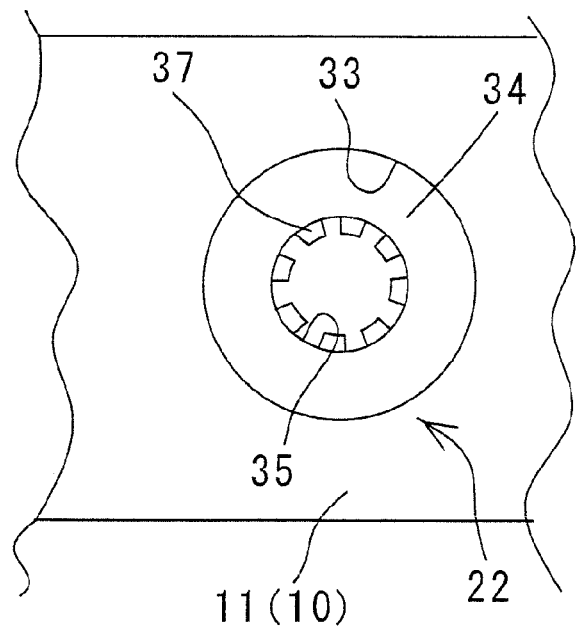
FIG. 7 is an enlarged view showing another modified example of thin guide pieces.
Figure 8:
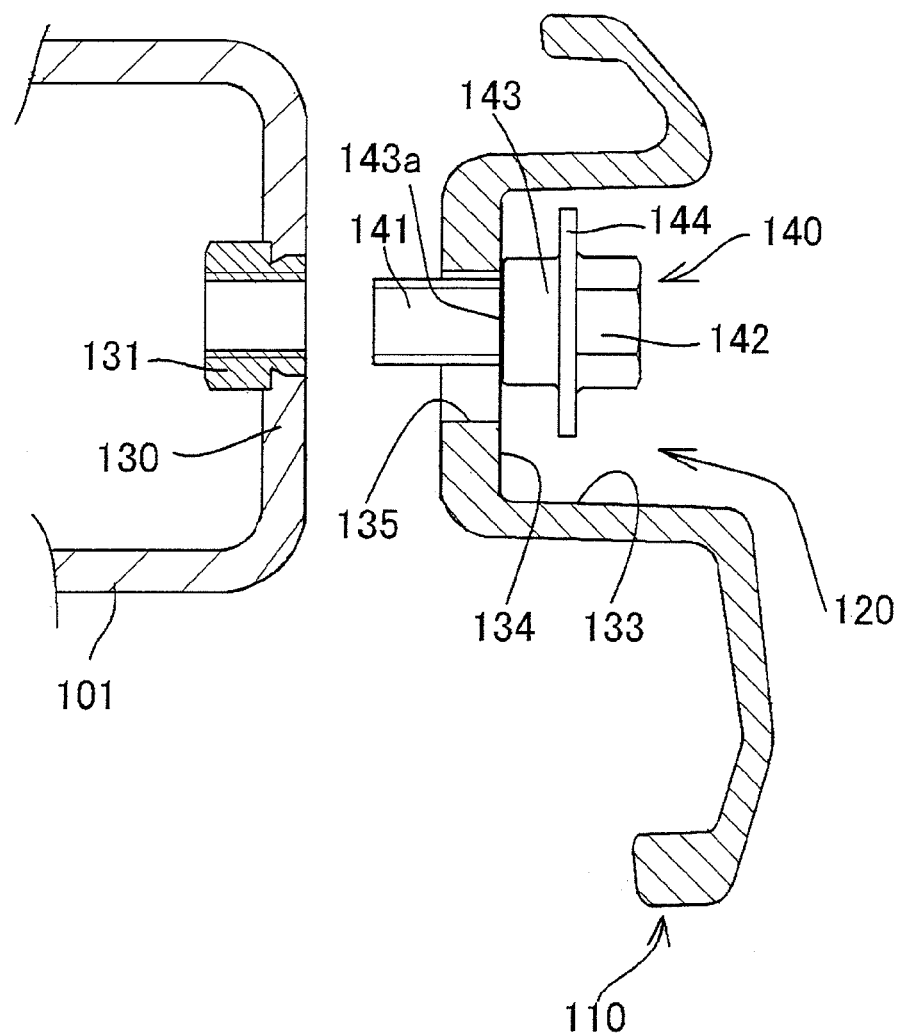
FIG. 8 is an exploded perspective view of a conventional example.

Other Embodiments (1) FIGS. 6 and 7 show modified examples of thin guide pieces. FIG. 6 is an example in which a large number of thin guide pieces 37 formed in a long-hole bolt insertion hole 35 are dividedly formed in the circumferential direction. FIG. 7 is an example in which a large number of thin guide pieces 37 formed in a round bolt insertion hole 35 are dividedly formed in the circumferential direction. As in FIGS. 6 and 7, in a case where the thin guide pieces 37 are dividedly formed, a pitch between the divided parts is formed to be narrower than a threaded shaft portion 41 of a shoulder bolt 40.

(2) In the embodiment shown in the figures, the axial formation position of the thin guide piece is set to be the position close to the opposite side to the attaching portion side in the axial direction of the bolt insertion hole. However, the formation position may be set to be an axially center part or position close to the attaching portion side.

(3) The resin part serving as an attachment object is not limited to the cowling but includes a resin fender, various resin covers, and the like.

(4) In the embodiment shown in the figures, the thin guide piece is formed at one point in the axial direction. However, the thin guide pieces can also be formed at a plurality of points in the axial direction.

(5) The present invention is not limited to the structure of the above embodiment but includes various modified examples obtained within a range not departing from the content described in the claims.

What is claimed is:

1. An attachment structure for a resin part of a motorcycle, the attachment structure comprising:
   an attaching portion with a nut provided on a side of a vehicle main body;
   a resin part having an attached portion with a bolt insertion hole; and
   a shoulder bolt for attaching the attached portion to the attaching portion with the nut,
   wherein the shoulder bolt has a threaded shaft portion, a washer, a head portion, and a large diameter portion arranged between the washer and the threaded shaft portion, the large diameter portion being thicker than the threaded shaft portion and thinner than the washer,
   wherein the bolt insertion hole has an inner diameter into which the large diameter portion of the shoulder bolt is insertable,
   wherein a thin guide piece protruding toward a radially inner side for regulating radial movement of the shoulder bolt within a predetermined range is integrally formed on an inner circumferential surface of the bolt insertion hole, and wherein the guide piece is configured to be deformed by the large diameter portion of the shoulder bolt.

2. The attachment structure for the resin part of the motorcycle according to claim 1, wherein the thin guide piece is formed in an annular shape over an entire circumference of the inner circumferential surface of the bolt insertion hole.

3. The attachment structure for the resin part of the motorcycle according to claim 1, wherein the thin guide piece is arranged on an opposite side to the attaching portion side with respect to an axially center position of the inner circumferential surface of the bolt insertion hole in an axial direction.

4. The attachment structure for the resin part of the motorcycle according to claim 1, wherein an axial length of the large diameter portion of the shoulder bolt is shorter than a thickness of the attached portion of the resin part by at least a fastening amount.

5. The attachment structure for the resin part of the motorcycle according to claim 1, wherein the resin part is a cowling for covering a vehicle body.

6. The attachment structure for the resin part of the motorcycle according to claim 5, wherein the cowling is formed by combining a plurality of differently-colored division parts, and the attached portion having the thin guide piece is formed in at least one of the parts.

7. The attachment structure for the resin part of the motorcycle according to claim 1, wherein the bolt insertion hole penetrates from a first surface of the attached portion to a second surface of the attached portion in a thickness direction of the attached portion,
wherein the guide piece is disposed between the first surface and the second surface of the attached portion, and a thickness of the guide piece is smaller than a thickness of the attached portion.

8. The attachment structure for the resin part of the motorcycle according to claim 7, wherein a thickness of the guide piece is 0.3 mm to 0.5 mm.

9. The attachment structure for the resin part of the motorcycle according to claim 1, wherein a thickness of the guide piece is 0.3 mm to 0.5 mm.

10. The attachment structure for the resin part of the motorcycle according to claim 1, wherein the bolt insertion hole penetrates from a first surface of the attached portion to a second surface of the attached portion in a thickness direction of the attached portion,
wherein the guide piece is disposed between the first surface and the second surface of the attached portion, and a thickness of the guide piece is smaller than a thickness of the attached portion, and
wherein the inner circumferential surface of the bolt insertion hole is disposed between the first surface and the second surface of the attached portion, and the guide piece extends radially inward from the inner circumferential surface and is configured to be bent over in the thickness direction by the large diameter portion of the shoulder bolt.

11. An attachment structure comprising:
an attaching portion with a nut provided on a side of a vehicle main body;
a resin part having an attached portion with a bolt insertion hole; and
a shoulder bolt for attaching the attached portion to the attaching portion with the nut,
wherein the shoulder bolt has a shaft portion with an external thread, a large diameter portion contiguous with the shaft portion and thicker than the shaft portion, and a washer arranged on an opposite side to the shaft portion and contiguous with the large diameter portion,
wherein the nut has an internal thread, and an internal diameter thereof is smaller than a diameter of the large diameter portion,
wherein the bolt insertion hole has an inner diameter that is larger than the diameter of the large diameter portion and smaller than an external diameter of the washer,
wherein the shoulder bolt is configured to fasten the attached portion to the attaching portion with the attached portion held between the washer of the shoulder bolt and the attaching portion and with the large diameter portion serving as a spacer disposed in the bolt insertion hole,
wherein a guide piece protruding toward a radially inner side for regulating radial movement of the shoulder bolt within a predetermined range is arranged on an inner circumferential surface of the bolt insertion hole.

12. The attachment structure of claim 11, wherein the bolt insertion hole penetrates from a first surface of the attached portion to a second surface of the attached portion in a thickness direction of the attached portion,
wherein the guide piece is disposed between the first surface and the second surface of the attached portion, and a thickness of the guide piece is smaller than a thickness of the attached portion, and
wherein the inner circumferential surface of the bolt insertion hole is disposed between the first surface and the second surface of the attached portion, and the guide piece extends radially inward from the inner circumferential surface and is configured to be bent over in the thickness direction by the large diameter portion of the shoulder bolt.

13. An attachment structure comprising:
an attaching portion with a nut provided on a side of a vehicle main body;
a resin part having an attached portion with a bolt insertion hole; and
a shoulder bolt for attaching the attached portion to the attaching portion with the nut,
wherein the shoulder bolt has a shaft portion with an external thread, a large diameter portion contiguous with the shaft portion and thicker than the shaft portion, and a seating-surface contacting portion contiguous with the large diameter portion and disposed on an opposite side of the large diameter portion from the shaft portion,
wherein the nut has an internal thread, and an internal diameter thereof is smaller than a diameter of the large diameter portion,
wherein the bolt insertion hole has an inner diameter that is larger than the diameter of the large diameter portion and smaller than an external diameter of the washer,
wherein the shoulder bolt is configured to fasten the attached portion to the attaching portion with the large diameter portion serving as a spacer disposed in the bolt insertion hole,
wherein a guide piece is arranged on an inner circumferential surface of the bolt insertion hole and is configured to guide the shaft portion into a center of the bolt insertion hole as the shoulder bolt is inserted in the bolt insertion hole.

14. The attachment structure of claim 13, wherein the bolt insertion hole penetrates from a first surface of the attached portion to a second surface of the attached portion in a thickness direction of the attached portion,
wherein the guide piece is disposed between the first surface and the second surface of the attached portion, and a thickness of the guide piece is smaller than a thickness of the attached portion, and wherein the inner circumferential surface of the bolt insertion hole is disposed between the first surface and the second surface of the attached portion, and the guide piece extends radially inward from the inner circumferential surface and is configured to be bent over in the thickness direction by the large diameter portion of the shoulder bolt.

* * * * *